(12) United States Patent
Saze et al.

(10) Patent No.: US 6,374,322 B1
(45) Date of Patent: Apr. 16, 2002

(54) BUS CONTROLLING SYSTEM

(75) Inventors: Nobuyuki Saze, Odawara; Atsushi Ishikawa, Minamiashigara; Tetsuzo Kobashi, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/256,177

(22) Filed: Feb. 24, 1999

(30) Foreign Application Priority Data

Feb. 27, 1998 (JP) ............................................ 10-046701

(51) Int. Cl.[7] .............................................. G06F 13/00
(52) U.S. Cl. ...................................... 710/316; 710/107
(58) Field of Search .................................. 710/107, 131, 710/132, 126, 129, 316, 317, 305; 370/401, 402; 709/200, 213, 220, 222, 238

(56) References Cited

U.S. PATENT DOCUMENTS

| | | | |
|---|---|---|---|
| 5,515,376 A | * 5/1996 | Murthy et al. | 370/402 |
| 5,687,089 A | * 11/1997 | Deyesso | 713/300 |
| 5,925,097 A | * 7/1999 | Gopinath et al. | 709/200 |
| 6,085,332 A | * 7/2000 | El-Batal | 714/5 |
| 6,148,356 A | * 11/2000 | Archer et al. | 710/127 |

FOREIGN PATENT DOCUMENTS

| | | | |
|---|---|---|---|
| JP | 8-320836 A | * 12/1996 | G06F/13/00 |
| JP | 9-81469 A | * 3/1997 | G06F/13/00 |

OTHER PUBLICATIONS

"Latest Personal Computer Technology '97", Nikkei BP, Sep. 10, 1996, pp. 103–107 (in Japanese).*

* cited by examiner

*Primary Examiner*—Glenn A. Auve
(74) *Attorney, Agent, or Firm*—Antonelli, Terry, Stout & Kraus, LLP

(57) ABSTRACT

In a system including a plurality of rotatable media type memory devices and disk array storage including in a redundant configuration a plurality of controllers each including a disk array control unit in which a plurality of SCSI bus coupling ports are individually coupled with respective ports of a plurality of host PCs/WSs via SCSI cables, the disk array control unit includes a function to logically transmit a bus operation such as a device or bus reset operation in an arbitrary one of the ports of the disk array storage to other ports. This makes it possible that the ports seems to be physically coupled in a daisy chain when viewed from the host PCs/WSs.

6 Claims, 9 Drawing Sheets

FIG. 4

| FROM \ TO | A | B | C | D |
|---|---|---|---|---|
| PORT A |  | 1 (B0) | 0 (C0) | 0 (D0) |
| PORT B | 1 (A0) |  | 0 (C1) | 0 (D1) |
| PORT C | 0 (A1) | 0 (B1) |  | 1 (D2) |
| PORT D | 0 (A2) | 0 (B2) | 1 (C2) |  |

EXAMPLE: BIT SET FOR PORT-TO-PORT CONNECTION NO. 7

53a

80

SCSI RECEIVER FOR
DIFFERENTIAL SIGNAL

SCSI DRIVER FOR
DIFFERENTIAL SIGNAL

FIG. 8

| PORT-TO-PORT CONNECTION NO. | PORT A | PORT B | PORT C | PORT D | SW NO. TO BE SET TO "ON" |
|---|---|---|---|---|---|
| 1 | o——o | | | | A0,B0 |
| 2 | o———————o | | | | A1,C0 |
| 3 | o——————————————o | | | | A2,D0 |
| 4 | | o——o | | | B1,C1 |
| 5 | | o——————————o | | | B2,D1 |
| 6 | | | o——o | | C2,D2 |
| 7 | o——o | | o——o | | A0,B0  C2,D2 |
| 8 | o————o————o | | | | A1,C0  B2,D1 |
| 9 | o————o————o | | | | A2,D0  B1,C1 |
| 10 | o——o——o | | | | A0,A1,B0,B1,C0,C1 |
| 11 | o——o————o | | | | A0,A2,B0,B2,D0,D1 |
| 12 | o————o——o | | | | A1,A2,C0,C2,D0,D2 |
| 13 | | o——o——o | | | B1,B2,C1,C2,D1,D2 |
| 14 | o——o——o——o | | | | A0~2,B0~2,C0~2,D0~2 |
| 15 | | | | | NONE |

BUS CONTROLLING SYSTEM

BACKGROUND OF THE INVENTION

The present invention relates to a bus controlling technology, and in particular, to a technology effectively applicable to a method of controlling buses on a host side in an apparatus such as a magnetic disk array storage connected to or coupled with a plurality of host computers including personal computers and workstations and to a configuration of the buses.

As described in, for example, pages 103 to 107 of "Latest Personal Computer Technology '97" published from Nikkei BP on Sep. 10, 1996, there have been well known a small computer system interface (SCSI) bus standard, an extended standard thereof, and the like as interfaces for connection of peripheral devices such as external storages in an information processing system including personal computers and workstations.

In the SCSI bus interface, it is commonly known that up to eight or 15 SCSI devices can be generally connected in a daisy chain configuration. However, when a failure occurs in either one of the SCSI devices in this layout of connection, there possibly exists a probability of a SCSI bus failure in many cases. Which leads to a problem of deteriorating high reliability of the entire computer system. To remove the problem, there has been introduced a technology as follows.

For example, in accordance with a technology of JP-A-8-320836, when a failure occurs in one of the SCSI devices coupled in a daisy chain, a central processing controller retries activation of the failed device. Namely, the controller operates a register in a power control circuit of a power controller to individually turn power of the failed device on or off. If the failure cannot be removed after a predetermined number retry operations, the controller turns power of the failed device off and then initializes the system again. In this technology, at a failure which cannot be removed only by turning power of the SCSI device off, it is necessary to once terminate operation of the system, for example, to replace the failed device. This consequently lowers operability of the system.

Additionally, JP-A-9-81469 describes a technology of a duplicated bus system to connect a plurality of functional modules to a control module which monitors and controls the functional modules. In the technology, the duplicated bus system includes a serial bus for the minimum monitoring and controlling operation in addition to a system bus, which is effective to identify a failed position at occurrence of a failure. However, there has not been described of any unit for separating a control module connected to the daisy chain. Namely, consideration has not been fully given to a system re-initialization after a failure associated with the bus. Furthermore, it has been generally known that when either one of the buses of the duplicated bus system is used as a backup bus at occurrence of a bus failure, usability of the system hard-ware resources is deteriorated; moreover, a degenerated bus controlling operation of the duplicated bus system causes considerable deterioration in the system performance.

In the conventional daisy chain connection, when a plurality of SCSI devices attempt to an SCSI bus access, the accesses of the respective devices are determined in accordance with SCSI arbitration priority levels thereof. Namely, a bus access wait time takes place for each SCSI device and hence the data transfer rate is lowered.

With increase in the computer system size, in the data processing speed, and in the data capacity, storage devices such as magnetic array storages are required to operate at a high speed with high reliability. In relation to the cluster layout of host computers, there has been known a method of sharing storage devices therebetween by connecting the devices via an SCSI bus in a daisy chain.

However, for a failure of a shared bus, the conventional technology has a technological problem that the failure possibly leads to an inconvenience situation in which the system cannot continue its operation.

SUMMARY OF THE INVENTION

It is therefore an object of the present invention is to provide a bus controlling technology for use in a system including a plurality of information processing apparatuses coupled via a particular bus interface to each other, the technology improving reliability of the system at occurrence of a bus failure.

Another object of is to provide a bus controlling technology for use in a system including a plurality of information processing apparatuses connected via a particular bus interface to each other, the technology improving throughput of data transfer between the information processing apparatuses.

Another object of the present invention is to provide a bus controlling technology for use in a system including a plurality of host computers coupled via a particular bus interface to particular peripheral devices, the technology improving reliability of the system at occurrence of a bus failure.

Another object of the present invention is to provide a bus controlling technology for use in a system including a plurality of host computers coupled via a particular bus interface to particular peripheral devices, the technology improving the data transfer throughput between the host computers and the peripheral devices.

To achieve the objects above in accordance with the present invention, in a second information processing apparatus including one or more controllers, each controller including a plurality of independent ports for controlling communication of information through an arbitrary bus protocol with a first arbitrary external information processing apparatus coupled via a bus interface with the second information processing apparatus and a control unit for controlling a data transfer between a plurality of ports, the control unit monitors a state of each of the ports and transmits at least a portion of a bus protocol to be executed in an arbitrary one of the ports to a bus interface of another one thereof.

Specifically, for example, a controller including a plurality of bus coupling ports includes a control unit to virtually establish a state in which the bus coupling ports seem to be physically connected in a daisy chain. The control unit includes, for example, a microprogram to logically transmit operation on a bus to ports other than a port related to the bus in a logically same controller. For each bus coupling port, there are disposed the controller and a device unit including an operator's console to set possibility or impossibility of execution the transmission control operation above.

BRIEF DESCRIPTION OF THE DRAWINGS

The objects and features of the present invention will become more apparent from the consideration of the following detailed description taken in conjunction with the accompanying drawings in which:

FIG. 4 is a diagram showing an example of setting a control information used in a bus controlling system in accordance with the present invention;

FIG. 8 is an explanatory diagram showing an example of a method of combining ports with each other in the embodiment of a bus controlling system in accordance with the present invention.

DESCRIPTION OF THE PREFERRED EMBODIMENTS

Description will be next given of an embodiment of the present invention by referring to the accompanying drawings.

Figure 1:
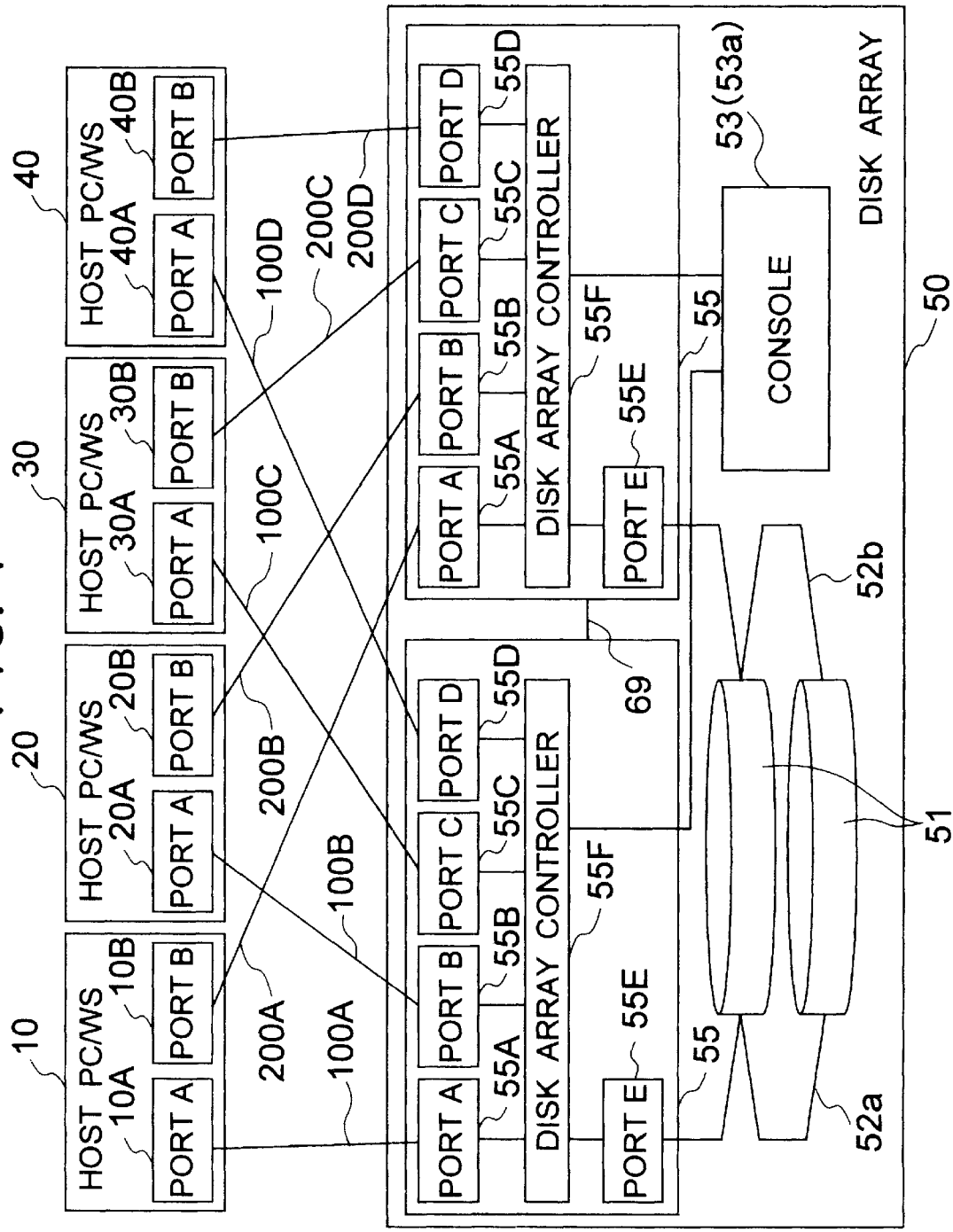
FIG. 1 is a schematic diagram showing an example of constitution of an embodiment of a bus controlling system in accordance with the present invention.

FIG. 1 shows in a schematic diagram an example of constitution of an embodiment of a bus controlling system in accordance with the present invention. In connection to this embodiment, description will be given of an example of the bus controlling system in which a plurality of host computers share an external storage such as a disk array storage. Although an SCSI bus is employed as an example for the bus interface in the description, it is to be understood that an arbitrary bus interface is applicable to the present invention.

The configuration of the embodiment includes a disk array storage (second information processing apparatus) 50 is connected or coupled to a plurality of host PCs/WSs (first information processing apparatuses) 10 to 40 via SCSI cables 100A to 100D and 200A to 200D.

Figure 3:
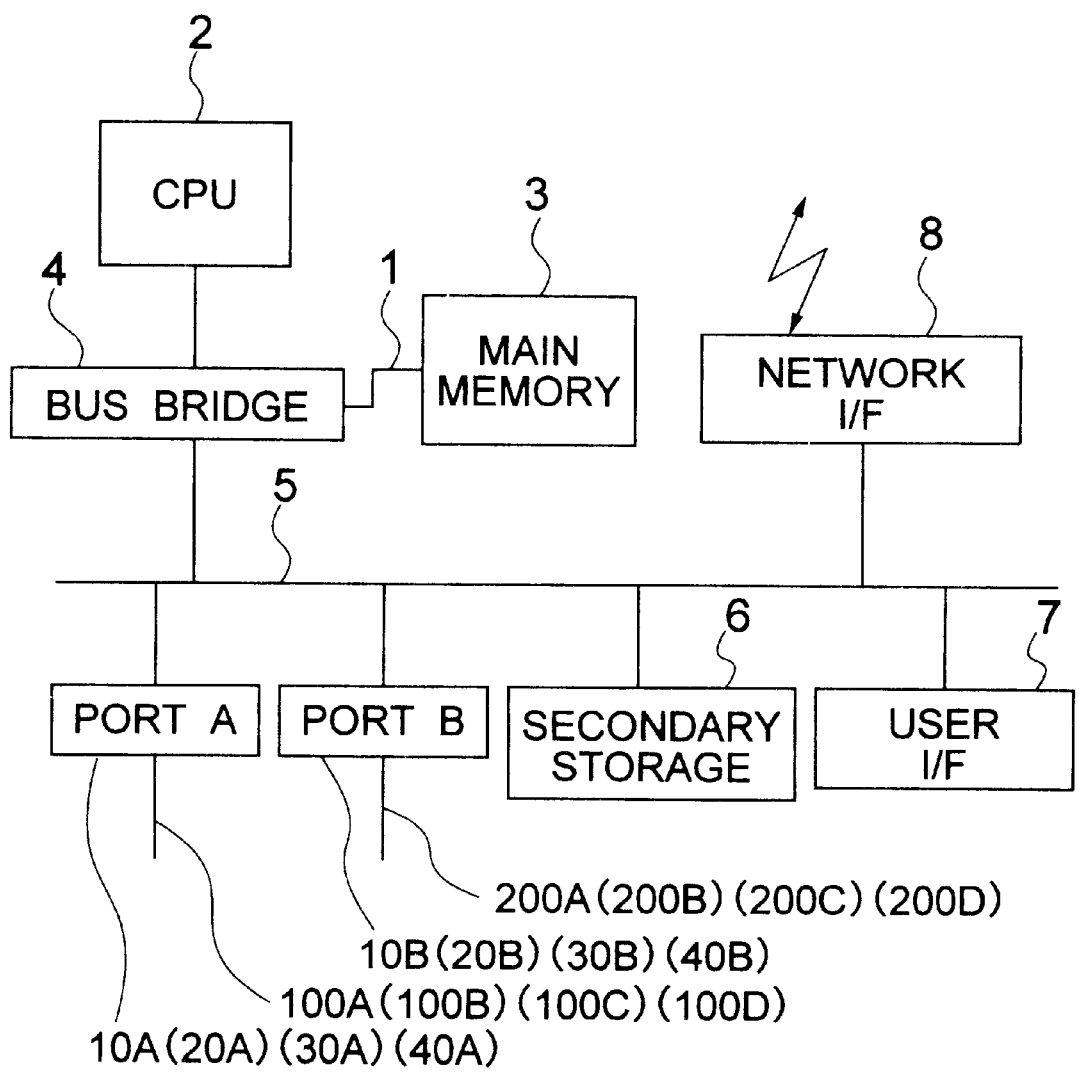
FIG. 3 is a diagram showing an example of constitution of an upper-grade apparatus constituting the embodiment of a bus controlling system in accordance with the present invention.

Each of the hosts PCs/WSs 10 to 40 includes an information processing apparatus, e.g., a personal computer or a workstation and includes, for example, a central processing unit (CPU) 2 such as a microprocessor, a main memory 3, and a bus bridge 4 which are coupled to each other via a system bus 1 as shown in FIG. 3. The bus bridge 4 is coupled via an extended bus 5 to an independent port A (10A to 40A) and an independent port B (10B to 40B) which are connected to the SCSI bus, a secondary storage 6, a user interface 7 including a display, a keyboard, and the like, and a network interface (I/F) 8. Each port includes an SCSI protocol controller and is capable of independently controlling the SCSI bus.

Additionally, the host PCs/WSs 10 to 40 are linked, when necessary, via the network interface 8 or the like with an information network such as a local area network (LAN). This may operate as, for example, a cluster server of a redundant system configuration in which control information and the like are exchanged via the information network.

The disk array storage 50 includes a plurality of rotatable media type memory devices 51 such as hard disk units and a plurality of controllers (control units) 55 which controls communication of information between the memory devices 51 and external devices and which are configured in a duplicated layout for higher reliability. Each memory device 51 of the disk array storage 50 includes a plurality of ports for data input and output operations, namely, is configured in a multiport memory. That is, each memory device 51 is individually connected or coupled via the device buses 52a and 52b in a duplicated configuration respectively to the controllers 55 also in a duplicated configuration.

Each controller 55 includes a disk array control unit 55F, a plurality of ports including a port A 55A, a port B 55B, a port C 55C, and a port D 55D which operates under the control unit 55F and which are connected or coupled via respective SCSI cables to external host PCs/WSs 10 to 40, and a port E 55E connected or coupled via the device bus 52a or 52b to the rotatable media type memory devices 51 associated with the controller 55. The disk array control unit 55F operates in accordance with control information set from an operator's console 53.

Figure 2:
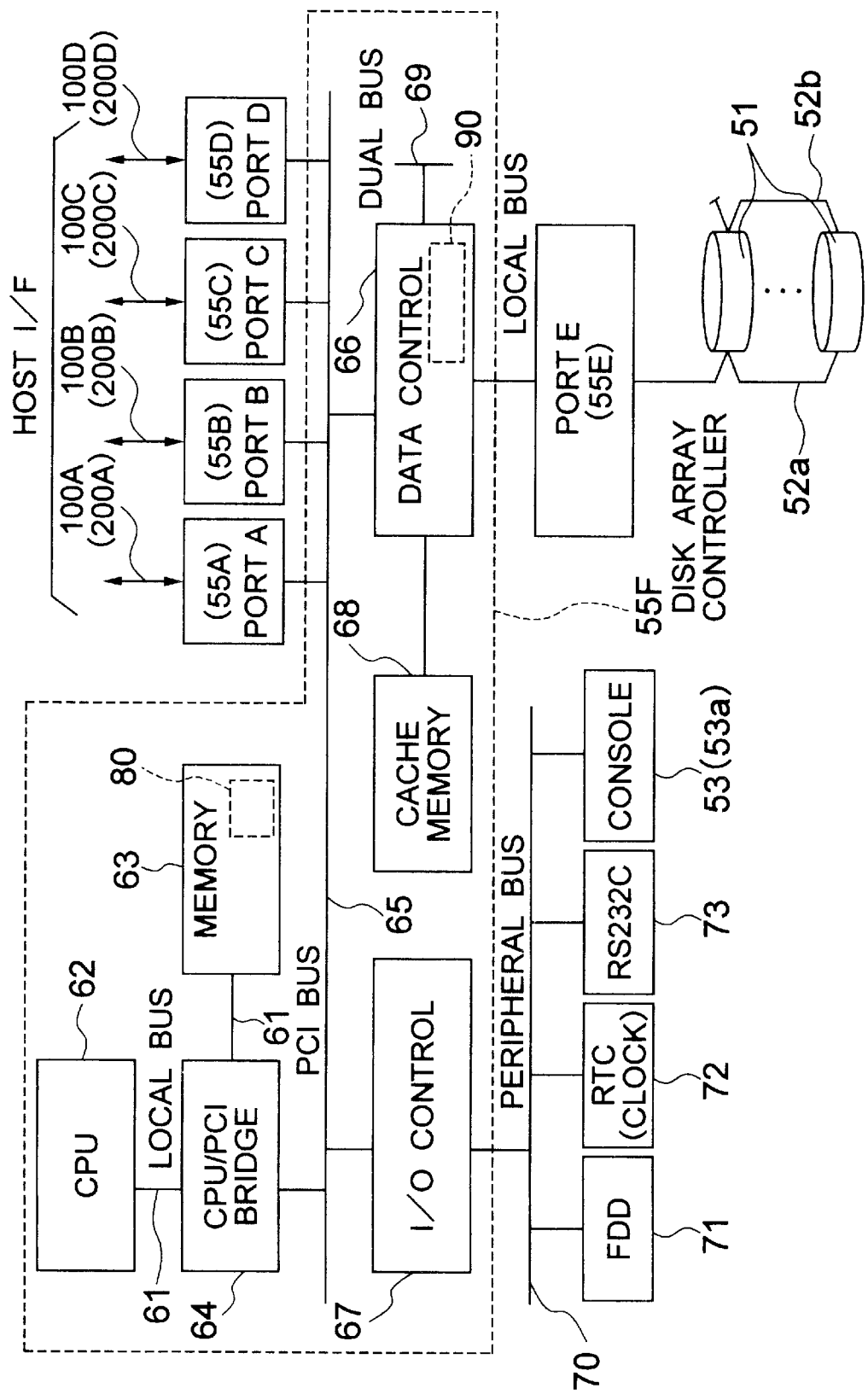
FIG. 2 is a diagram schematically showing an example of constitution of a disk array controller in the embodiment of a bus controlling system in accordance with the present invention.

FIG. 2 shows in a schematic diagram an example of constitution of the embodiment of the disk array control unit in accordance with the present invention.

A central processing unit (CPU) 62 such as a microprocessor to control overall operation of the disk array control unit is coupled via a local bus to a main memory 63 in which a control program of the CPU 62 and the like are stored. The local bus 61 is coupled via a bus bridge 64 with a general bus 65 such as a PCI bus.

The general bus 65 is connected or coupled to the ports A (55A) to D (55D) on the host side. Each port. independently includes, for example, an SCSI protocol controller (SPC) having a function to conduct a control operation of the SCSI bus interface. For the SPC, there can be used an SPC IC or an SPC LSI available in the market.

Moreover, the general bus 65 is coupled to an input/output (I/O) controller 67 and a data controller 66 to control operation of the port E 55E to which the device 52a or 52b is coupled. The port E includes an interface, for example, an SCSI interface in association with a connecting interface of the rotatable media type memory device 51 related thereto.

The data controller 66 is linked with a dual bus 69 and a cache memory 68 including a semiconductor memory or the like in which data communicated with the rotatable media type memory device 51 related thereto is temporarily stored. The dual bus 69 is disposed, when there is used a duplicated controller layout for the control operation of a plurality of controllers 55 (disk array control units 55F) in a redundant configuration, to communicate control information and data between the controllers.

The I/O controller 67 is coupled via a peripheral bus to a subordinate storage 71 such as a floppy disk drive unit, a realtime clock 72, and a serial interface 73 such as an RS232C, and an operator's console 53 supporting an interface for maintenance and other operations.

As can be seen from FIG. 3, each of the ports A (10A to 40A) and ports B (10B to 40B) related to the host PCs/WSs 10 to 40 includes a control unit for an SCSI bus interface capable of independently controlling the SCSI bus.

In other words, if the ports are connected via an SCSI cable through the same SCSI interface, there occurs no problem even in a configuration in which, for example, the port A 55A is of a single end narrow SCSI, the port B 55B is of a single end wide SCSI, the port C 55C is of a differential end narrow SCSI, the port B 55B is of a differential end wide SCSI. This makes it possible to construct a flexible system with a high degree of freedom.

Figure 9:
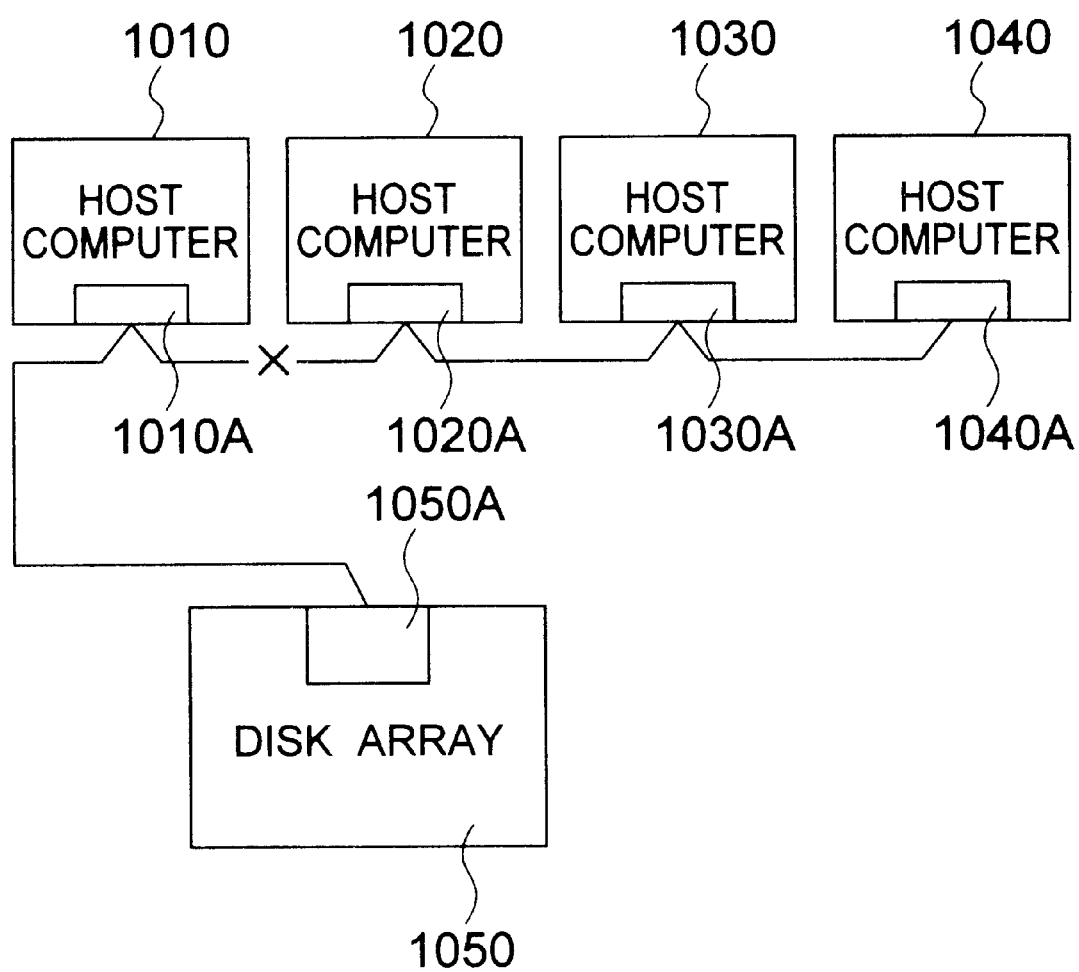
FIG. 9 is a schematic diagram showing a considerable conventional example of the method of coupling ports of the SCSI bus.

In an example of the daisy chain connection, for example, as shown in FIG. 9 in which ports 1010A, 1020A, 1030A, and 1040A respectively of host PCs/WSs 1010 to 1040 are physically linked via an SCSI bus 1060 with a port 1050A of a disk array storage 1050, when there occurs a failure, which leads to an SCSI bus failure, in either one of the ports 1010A to 1040A, it is impossible to access the disk array storage 1050 from any port.

In contrast therewith, in accordance with the embodiment, the SCSI cables 100A to 100D are coupled to the ports on the host side as well as the ports on the disk array transmission side in a port-to-port fashion as shown in FIG. 1. In this situation, the disk array control unit 55F of the controller 55 logically controls the respective ports by a microprogram or the like. Namely, the control unit 55F analyzes operation of the SCSI bus of each of the ports 55A to 55D and achieves a control operation such that the ports seems to be physically connected in a daisy chain. For example, the control unit 55F executes processing to transmit an operation on an SCSI bus received at the port 55A to the SCSI buses of the other ports 55B to 55D of the same controller 55.

An example of operation on the SCSI bus to be logically controlled as above includes an SCSI bus reset and an SCSI device reset. In the case of the SCSI bus reset, the disk array control unit 55F on detecting an event that the SCSI bus reset instruction is received by the port, resets any SCSI command or the like which is being executed or which is in a wait state in the same controller 55. Thereafter, the control unit 55F issues a reset command to the ports other than the ports which have received the SCSI bus reset instruction. Each port which has received the reset command issues an SCSI bus reset request to the associated host PC/WS.

In this case, whether or not the bus reset request is to be issued is determined in accordance with a value set from the operator's console 53 to a switching or relay control table 80 or the like disposed, for example, in the main memory 63 of the disk array control unit 55F of the controller 55.

The operator's console 53 includes a keyboard and a display 53a that shows a setting state, under which the disk array control unit 55F logically controls ports in a predetermined relationship in the controller. In this setting state, all ports may be set as one group of a daisy chain or some ports may be set as a plurality of daisy-chain groups.

FIG. 4 shows in a schematic diagram an example of structure of the relay control table 80. In FIG. 4, the relay sources including ports A to D are indicated in a vertical direction and the relay destinations including ports A to D are arranged in the horizontal direction. A one-bit entry in the intersecting zone between the vertical and horizontal regions indicated as above is "1" or "0" to control connection or non-connection between the designated relay source and destination ports. The set/reset state of each bit of the relay control table 80 is displayed on a screen of the display 53a of the operator's console 53, for example, in the layout shown in FIG. 4 so that the system manager can externally set or reset the bit from the keyboard, not shown, when necessary.

In the example of FIG. 4, the port-to-port connections are set for a switching relationship indicated as port-to-port connection no. 7 in FIG. 8. Namely, in the setting state of FIG. 4, SCSI resetting commands received by the ports A and C are respectively relayed to the ports B and D; similarly, SCSI resetting commands received by the ports B and D are respectively relayed to the ports A and C.

Although presence or absence of the bi-directional relaying operation between two particular ports is determined by two bits as above, it may also possible, when necessary, to set only one of the bits to thereby specify a one-directional relaying operation between two ports.

Moreover, the SCSI bus device reset is processed by the disk array control unit 55F in the same manner as for the SCSI bus reset. However, the SCSI bus device reset differs from the SCSI bus reset in that the SCSI bus device reset is not issued to the associated host PCs/WSs.

Figure 5:
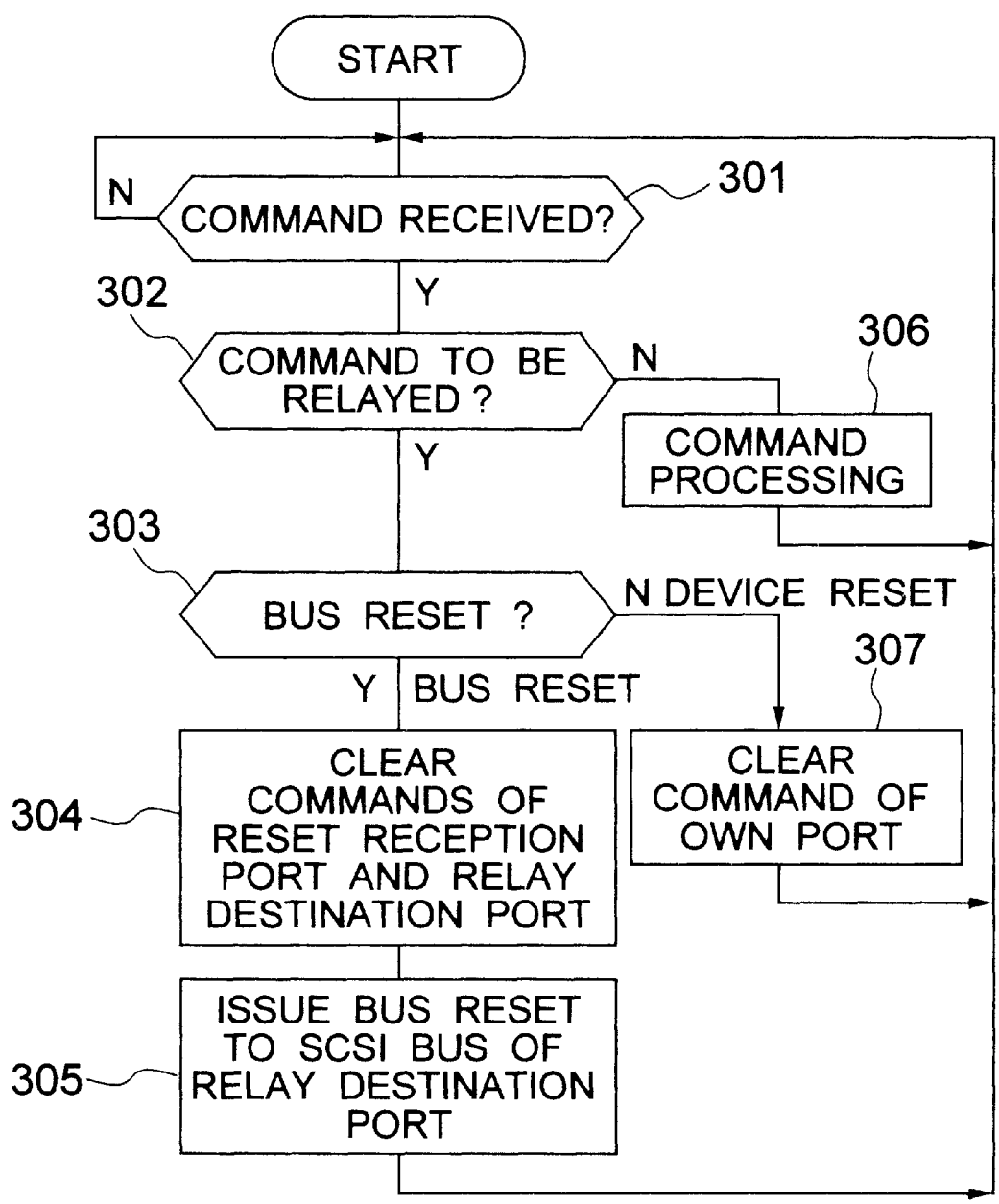
FIG. 5 is a flowchart showing an example of operation of the embodiment of a bus controlling system in accordance with the present invention.

FIG. 5 shows in a flowchart an example of operation of a control program stored in the main memory to logically conduct a switching or relaying control operation between the SCSI ports described above.

First, the program monitors presence or absence of a command reception at each port (step 301). When a command reception is detected, it is determined whether or not the command received is to be relayed. If the command is not to be relayed, there is executed ordinary processing for the command (step 306) and then process returns to step 301.

If the command is determined to be relayed, a check is made whether or not the command is a bus reset. If the command is other than the bus reset (i.e., the command is a device reset), the program clears a command or the like stored in the own port, for example, by a preceding command with a tag, and then process returns to step 301.

If the command is recognized as a bus reset in step 303, commands of the reset reception port and the relay destination port are cleared (step 304) and then a bus reset is issued to an SCSI bus of the relay destination port (step 305).

In this situation, to issue the bus reset, there may be set a truth value to an SCSI reset register of the SCSI protocol controller (SPC) in each port.

The configuration of the embodiment, under control of the software, can establish a state in which the ports A to D those are capable of independently controlling the SCSI interface seem to be logically coupled in a daisy chain, viewed from the upper-grade apparatuses PC/WS10~PC/WS40.

Thanks to the configuration, in a failure of a shared bus, which causes in a daisy chain connection, for example, it is possible for the configuration to remove physical connections between devices related to the ports A to D so as to logically emulate the daisy chain connection. Therefore, the embodiment can minimize for example, an occurrence of a bus failure caused by a failure in a port, even if the port failure is propagated to other ports, which leads to an disadvantage that all of the SCSI cables (buses) in the redundant layout become inoperable. This resultantly improves reliability of the system at a bus failure.

Since the SCSI buses logically connected in a daisy chain are physically independent of each other in an ordinary state, an independent arbitration is conducted for each SCSI bus in other than the relaying operation of the reset or the like. Namely, since there exists no access conflict for each device of each SCSI bus, the bus access performance can be increased by concurrently operating a plurality of SCSI buses.

In the description above, although a plurality of SCSI buses are logically connected by software, it may also possible to employ a switch or the like in a portion of the SCSI interface signal line so that the SCSI buses seem to be virtually connected in a daisy chain by hardware.

Figure 6:
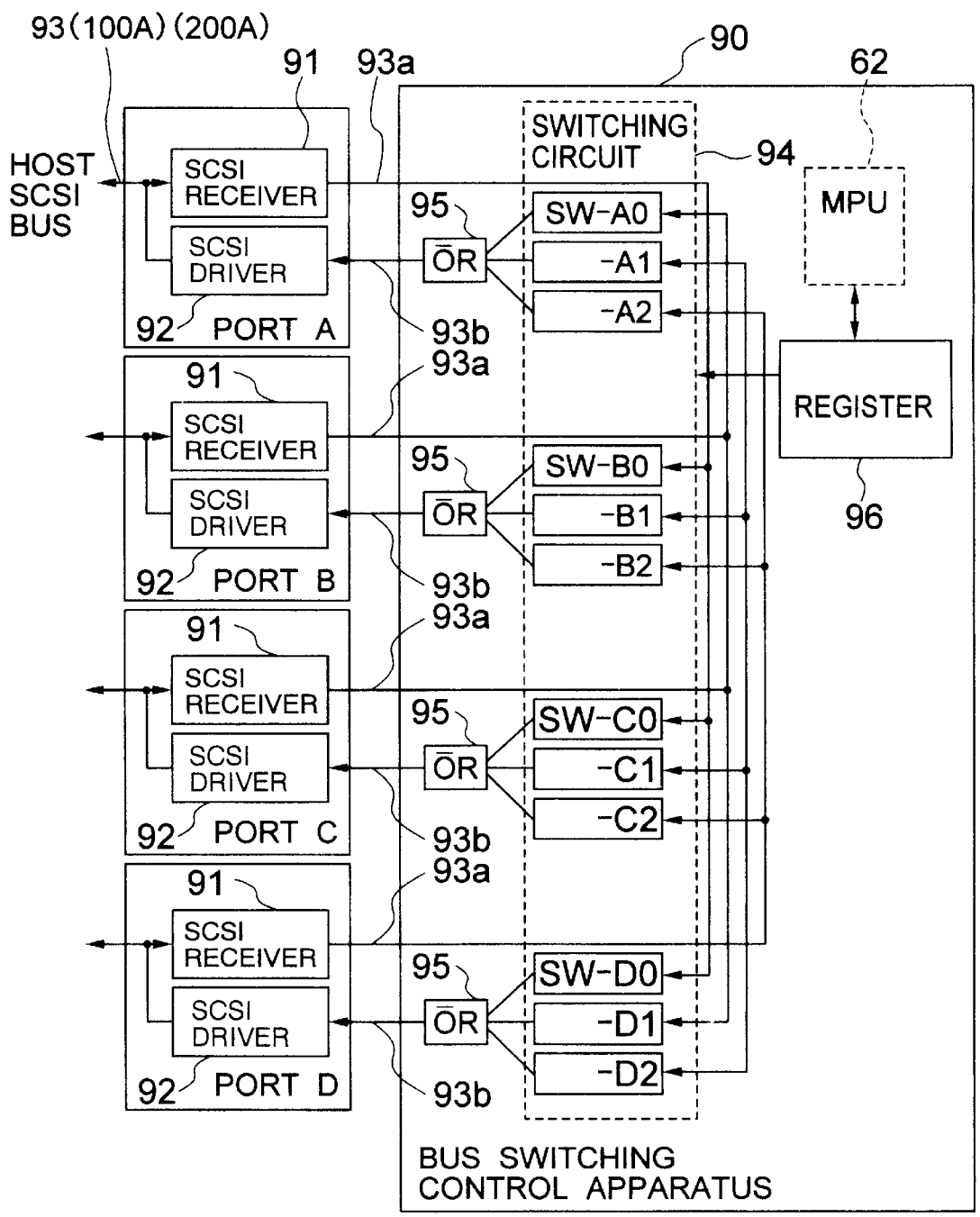
FIG. 6 is a schematic diagram showing an example of constitution of a bus switching control apparatus in the embodiment of a bus controlling system in accordance with the present invention.

FIG. 6 shows in a schematic diagram an example of constitution of the bus switching control unit in the embodiment of the present invention.

The bus switching control unit 90 of the embodiment includes a plurality of a switching circuit 94, OR circuits 95 and a register 96. The switching circuits of the own port (SW-A0 to SW-A2, SW-B0 to SW-B2, SW-C0 to SW-C2, and SW-D0 to SW-D2: 94) conduct reset inputs 93a received via SCSI receivers 91 of the other ports those are three of ports A to D except the own port, from reset signal lines 93. The OR circuits 95 produce logical sums of a plurality of outputs from the switching circuits corresponding to each port A to D, respectively. The switches, i.e., SW-A0 to SW-A2, SW-B0 to SW-B2, SW-C0 to SW-C2, and SW-D0 to SW-D2 can be turned on and off in accordance with values set to the register 96.

The bus switching control unit 90 can be arranged in a portion of the disk array control unit 55 shown in FIG. 2, and the setting values to the register 96 can be accessed via a general bus 65 by a CPU 62.

As can be seen from an example of FIG. 8, there exist 14 combinations of port-to-port connections which are established between the ports A to D by the switches (SW-A0 to SW-A2, SW-B0 to SW-B2, SW-C0 to SW-C2, and SW-D0 to SW-D2) of the switching circuit 94 in accordance with the setting values in the register 96.

The CPU 62 establishes the 14 combinations of port-to-port connection no. 1 to 14 of FIG. 8 according to the values of bits of the relay control table 80 described above.

Figure 7A:
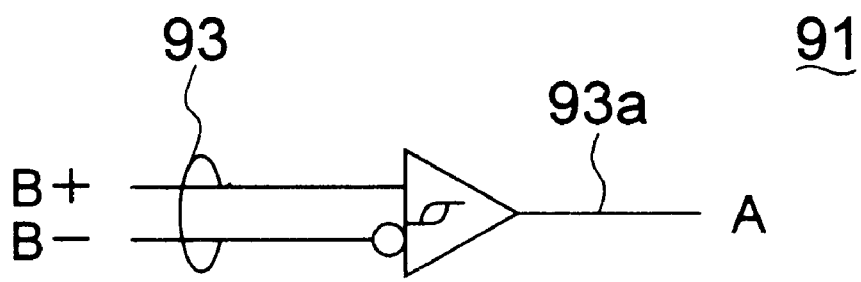
FIGS. 7A and 7B are diagrams schematically showing examples of constitution of an SCSI receiver and an SCSI driver in a port of an SCSI bus of the embodiment of a bus controlling system in accordance with the present invention.
Figure 7B:
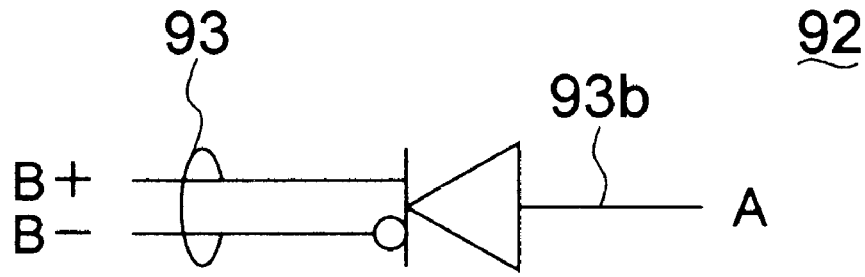

In this regard, when the signal specification (of the number of signals lines, the signal voltage level, etc.) varies between the ports A to D, for example, there are utilized the single end type and the differential type in the ports A to D, it is possible to modify the specification to a differential type by using a differential-type SCSI receiver of FIG. 7A for the SCSI receiver 91 and a differential-type SCSI driver of FIG. 7B for the SCSI driver 92. In this connection, the driver and receiver circuits shown in FIGS. 7A and 7B can be easily implemented with an IC and/or an LSI such as SN75976A2 of Texas Instruments Incorporated.

Thanks to the switching circuit 94 shown in FIGS. 6, 7A, 7B, and 8, there can be obtained advantages as follows. Even if the relay operation of the SCSI bus signals is partially accomplished by hardware, it is possible by mutually relay the reset sequence to establish a state in which some of the ports A to D seem to be connected in a daisy chain in an arbitrary manner. Moreover, since each port operates as an independent SCSI bus in other than the reset sequence, it is possible, as in the software control of the CPU 62 described above, to prevent a bus failure from causing another bus failure as well as to improve the system throughput by the concurrent operation. Further, the CPU 62 has lighter load than in software control.

Although the controller 55 includes four ports on the host PC/WS side in the description of the embodiment above, the number of ports may range from two to n. Furthermore, an SCSI bus interface has been described as an example of the bus interface. However, the operation above can be similarly achieved with another interface, e.g., a fiber channel interface.

Description has been given of the present invention of the present inventors by referring to embodiments. However, the present invention is not limited to the embodiments and various changes and modifications thereof are possible within the scope of the present invention.

For example, the configuration of the disk array storage of the bus controlling system and that of the host PCs/WSs are not restricted by the embodiment above. Namely, the disk array storage and the host PCs/WSs may be configured in an arbitrary fashion.

In accordance with the bus controlling system of the present invention, there can be obtained an advantage of an improved reliability at a bus failure in a system in which a plurality of information processing apparatuses are coupled with each other via an arbitrary bus interface.

Additionally, in accordance with the bus controlling system of the present invention, there can be obtained, in a system including a plurality of information processing apparatuses coupled with each other via an arbitrary bus interface, an advantageous effect that the data transfer throughput is improved between the information processing apparatuses.

In accordance with the bus controlling system of the present invention, there can be obtained an advantage of an improved reliability at a bus failure in a system in which a plurality of host computers are coupled with arbitrary peripheral units via an arbitrary bus interface.

Furthermore, in accordance with the bus controlling system of the present invention, there can be obtained, in a system including a plurality of host computers coupled with arbitrary peripheral units via an arbitrary bus interface, an advantage that the data transfer throughput is improved between the information processing apparatuses.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A bus emulating system comprising:
 a controller controlling input and output of data among a plurality of computers, via cables; and
 a storage device which stores data transmitted from said plurality of computers,
 wherein said controller comprises:
  a plurality of ports each of which are coupled to a port on one of said plurality of computers in a port-to-port configuration, and
  wherein said controller includes a function that when a first bus-reset signal is issued on a first cable coupled to a first host computer among said plurality of computers, said controller issues a second bus-reset signal on a second cable which is different from said first cable, said second cable being coupled to a second host computer among said plurality of host computers.

2. A bus emulating system according to claim 1, wherein said controller further includes a function that regulates a relationship between said first cable and said second cable when said first bus-reset signal is issued.

3. A bus emulating system according to claim 2, wherein said controller further comprises:
 a first port coupled to said first cable and a second port coupled to said second cable,
 wherein said controller further includes a function that relays a signal from the first port to the second port under one-way communication.

4. A bus emulating system according to claim 1, wherein said cables which couple said controller and said plurality of computers operate under SCSI regulation.

5. A bus emulating system according to claim 4, wherein said function of issuing said second bus-reset signal is performed by a logical circuit with a switch that connects said first cable and said second cable.

6. A bus emulating system according to claim 1, wherein said cables which couple said controller and said plurality of computers are fiber channels.

* * * * *